(12) United States Patent
Lang et al.

(10) Patent No.: US 6,499,718 B2
(45) Date of Patent: Dec. 31, 2002

(54) FLUENT MATERIAL CONTAINER AND DISPENSER

(75) Inventors: Damian L. Lang, Rte. 1, Box 167-1A, Waterford, OH (US) 45786; Michael D. West, McConnelsville, OH (US)

(73) Assignee: Damian L. Lang, Waterford, OH (US)

( * ) Notice: Subject to any disclaimer, the term of this patent is extended or adjusted under 35 U.S.C. 154(b) by 0 days.

(21) Appl. No.: 09/952,427

(22) Filed: Sep. 14, 2001

(65) Prior Publication Data

US 2002/0030145 A1 Mar. 14, 2002

Related U.S. Application Data

(63) Continuation of application No. 09/680,682, filed on Oct. 6, 2000, which is a continuation of application No. 09/413,618, filed on Oct. 6, 1999, now Pat. No. 6,206,249, which is a continuation-in-part of application No. 09/241,813, filed on Feb. 2, 1999, now Pat. No. 6,112,955.

(51) Int. Cl.[7] ............................................... F16K 51/00
(52) U.S. Cl. .................. 251/144; 251/148; 137/565.01; 137/561 A; 415/72; 416/177
(58) Field of Search ........................... 415/72; 416/177; 137/561 A, 565.01; 251/148, 144

(56) References Cited

U.S. PATENT DOCUMENTS 2,606,645 A * 8/1952 Heine ........................... 415/72
5,102,294 A * 4/1992 Hayashi ........................ 415/72
5,709,468 A * 1/1998 Woerheide et al. ........... 366/337
5,810,032 A * 9/1998 Hong et al. ............... 137/561 A

FOREIGN PATENT DOCUMENTS

GB 316468 * 8/1929 .................. 415/74

* cited by examiner

Primary Examiner—A. Michael Chambers
(74) Attorney, Agent, or Firm—Jason H. Foster; Francis T. Kremblas, Jr.; Frank H. Foster

(57) ABSTRACT

A fluent material containing and dispensing apparatus including a hopper having four sidewalls. A tube mounts to one of the sidewalls, and an auger extends from one end of the tube to the opposite end of the hopper, driving material in the hopper through the tube when the auger is rotated. A flexible hose is mounted to the underside of the tube and material in the tube pours into the hose, which can be kinked to slow or stop flow of material. A gap is formed between the outer surfaces of the auger and the tube wall. A radially inwardly extending flange can be mounted to the tube wall to slow the flow of material through the gap. Alternatively, a compressible sleeve can be mounted in the gap between the outer surfaces of the auger and the tube wall extending a substantial length of the tube.

4 Claims, 8 Drawing Sheets

FLUENT MATERIAL CONTAINER AND DISPENSER

This application is a continuation of pending U.S. application Ser. No. 09/680,682, filed Oct. 6, 2000, which is a continuation of Ser. No. 09/413,618 filed Oct. 6, 1999 U.S. Pat. No. 6,206,249 issued Mar. 27, 2001, which is a Continuation-In-Part of Ser. No. 09/241,815 filed on Feb. 2, 1999 U.S. Pat. No. 6,112,955 issued Sep. 5, 2000.

BACKGROUND OF THE INVENTION

1. Field of the Invention

The invention relates to a container for dispensing fluent material, including slurries, high viscosity liquids and particulate matter such as gravel, sand and dust.

2. Description of the Related Art

Solid concrete walls are made from assembling wood or metal plates to form a mould having a void that is filled with concrete. Hollow concrete walls are commonly constructed by stacking and cementing hollow concrete blocks on one another. The concrete block wall's interior surfaces can serve as a mould for wet cement that is poured into the voids and subsequently hardens to make the wall solid concrete. This is referred to as "grouting" a wall, and the concrete slurry that is poured during grouting is referred to as grout.

Solid concrete walls, however they are made, are stronger than hollow walls. Furthermore, solid walls can have reinforcing devices, such as reinforcement bars and wires, inserted in the concrete prior to curing to further strengthen them. However, grouting walls is difficult work.

Conventionally, concrete walls and other concrete structures are poured or filled by pumping wet concrete long distances through hoses from trucks, or using the "bucket and shovel" method in which buckets are hand loaded, carried and dumped into the moulds. Both of these methods have disadvantages, including expensive labor or equipment and long completion times.

Alternatively, people have used hoppers with chutes that direct concrete, but such chutes are prone to overflow if the flow of concrete is stopped at the discharge end of the chute. The use of a pump and hoses is a cumbersome process that requires starting and stopping the pump, which does not immediately stop the movement of the flowing concrete in the hose due to the concrete's inertia. A shutoff valve at the discharge end of hoses is necessary to immediately stop the flow. However, such valves are complex and normally do not last in the environment of wet concrete, even if they are cleaned, which itself is a difficult process. Concrete tends to harden on moving valve parts, eventually preventing movement and thereby rendering the valve useless.

Therefore, there is a need for a device that permits rapid, inexpensive and accurate filling of voids in block walls and other moulds. Such a device should limit the amount of spilled concrete, and permit maximum control for the person pouring the concrete.

BRIEF SUMMARY OF THE INVENTION

The invention is an apparatus for containing and dispensing fluent material. The apparatus includes four main elements: a hopper, an elongated tube, an elongated auger and a hand-flexible hose. The elements cooperate in such a manner to overcome disadvantages in the prior art. With the present invention, the material drive member, which is the auger, does not need to be shut off during grouting when the operator needs to move to another opening. Furthermore, there is little or no danger of damage to the auger if large particulate matter, such as a stone, becomes lodged between the lands of the auger and the tube sidewall.

The hopper has a first sidewall including a tube aperture, a second sidewall, and two other sidewalls. All sidewalls have substantially equal length. The sidewalls are joined at four intersecting corners and define a material-containing chamber with an open top end for receiving fluent material.

The elongated tube is rigidly connected at a hopper end of the tube to the first sidewall of the hopper. The tube extends to an opposite, hose end of the tube spaced from the hopper end of the tube. The tube has a cylindrical tube wall including an interior surface that defines a tube passage. The tube passage is aligned with the tube aperture and extends from the hose end of the tube through the tube aperture to the material-containing chamber of the hopper.

The elongated auger is mounted within the tube passage and extends substantially coaxially with the tube from a first bearing mounted near the hose end of the tube, through the tube aperture to a second bearing, preferably a motor, mounted near the second sidewall of the hopper. A radial gap is formed between the outer surface of the auger and the interior surface of the tube wall.

The hose has hand-flexible sidewalls, an interior surface defining a hose passage and openings at opposite first and second ends. The first hose end is mounted to a hose mount formed on the tube near the tube's hose end. The hose passage communicates with the tube passage.

During operation, the auger rotates, driving material from the hopper through the tube toward the hose. As the operator discharges material from the discharge end of the hose, the void into which the material is directed becomes full, necessitating moving the hose to another void. The operator merely pinches the hose closed with his or her hands and pulls the flexible hose to the next void. The auger need not be stopped during this movement, because flow through the hose is blocked by the pinched part of the hose, thereby stopping flow of material.

Figure 1:
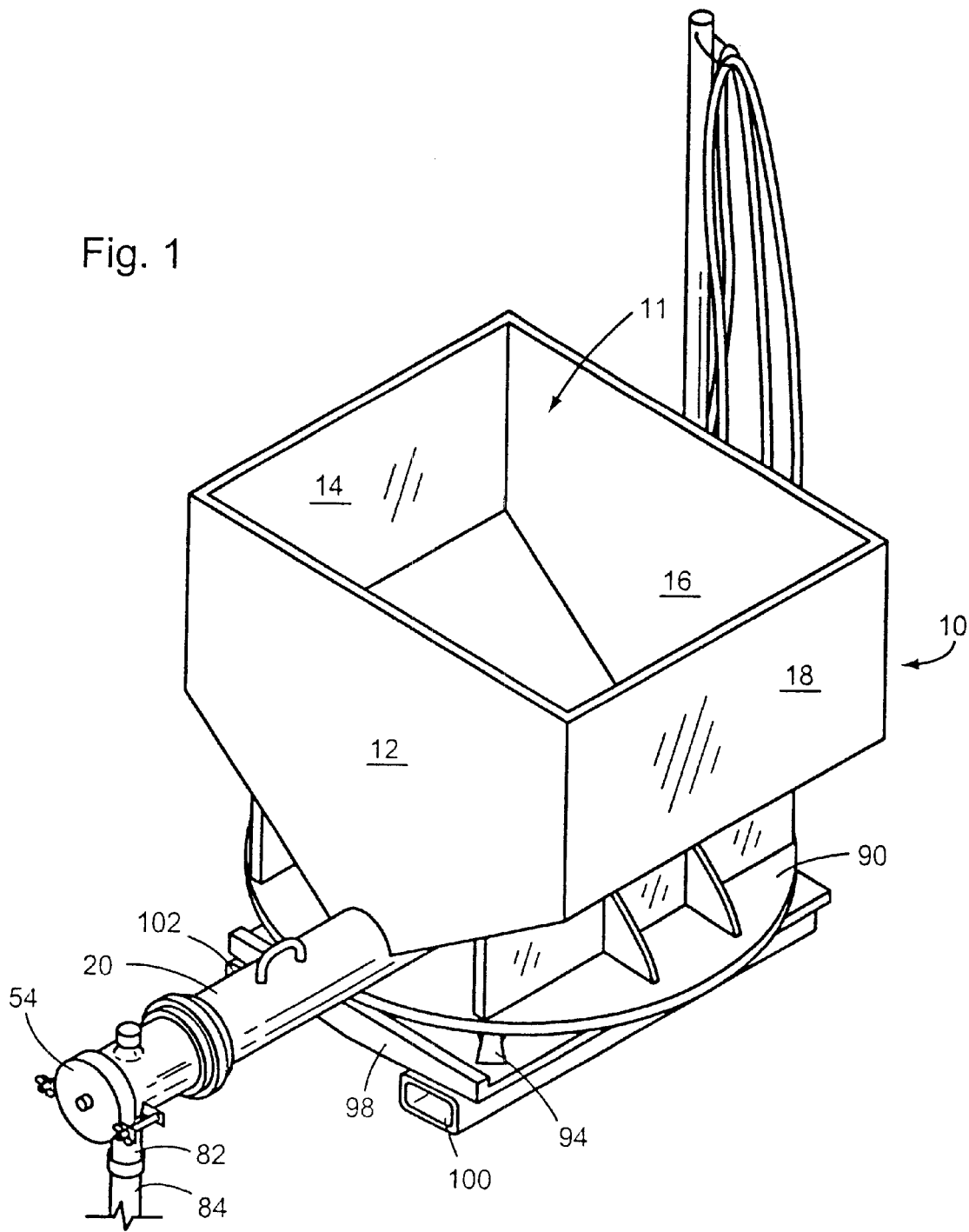
FIG. 1 is a view in perspective illustrating the preferred embodiment of the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used:. They are not limited to direct connection but include connection through other elements where such connection is recognized as being equivalent by those skilled in the art.

DETAILED DESCRIPTION OF THE INVENTION

The preferred embodiment of the present invention is shown in FIGS. 1–4. As discussed above, the invention includes four main cooperating parts: the hopper 10, the tube 20, the auger 50 and the hose 84.

Figure 2:
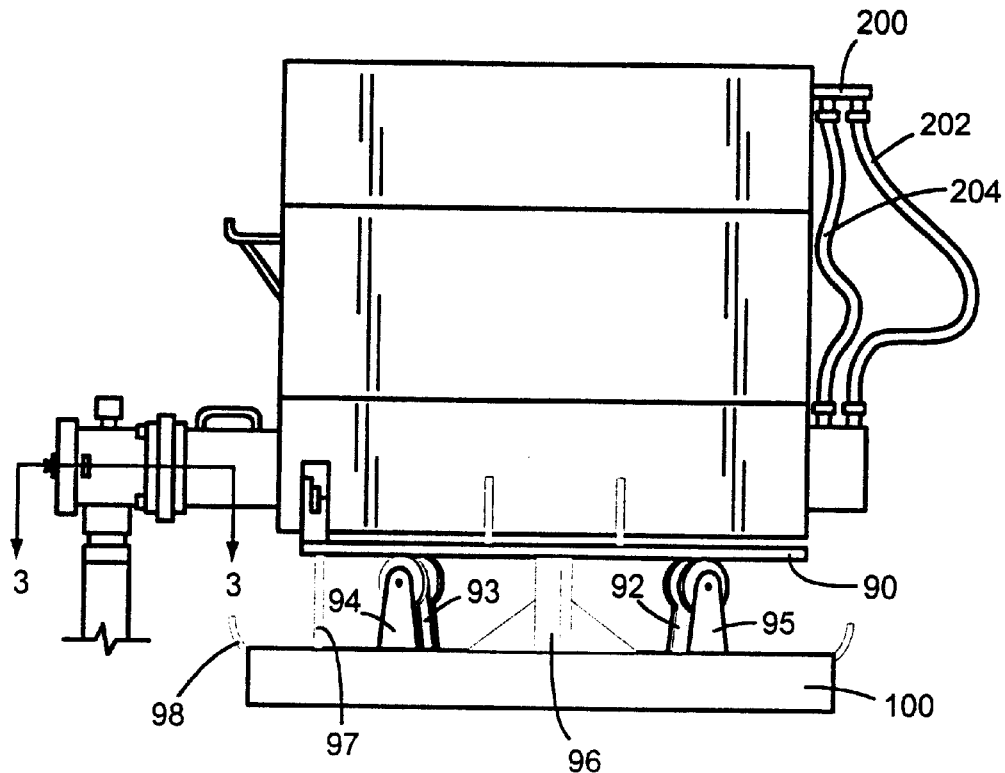
FIG. 2 is a side view illustrating the preferred embodiment of the present invention.
Figure 3:
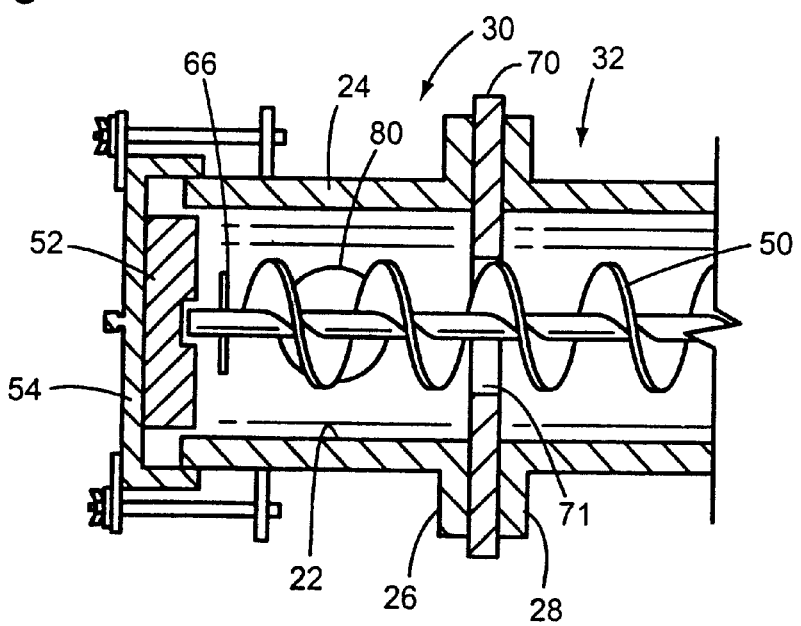
FIG. 3 is a top view in section through the line 3—3 of FIG. 2.
Figure 4:
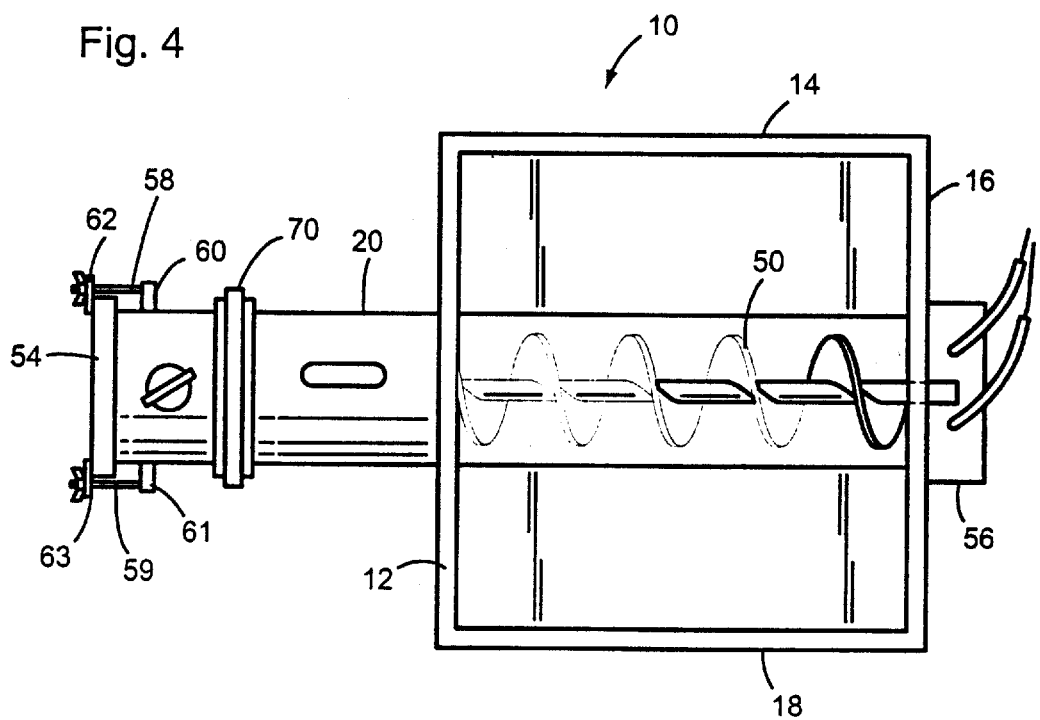
FIG. 4 is a top view illustrating the preferred embodiment of the present invention.

The hopper 10 is shown in FIGS. 1 and 2 having four substantially equal length sidewalls 12, 14, 16 and 18. The sidewalls join at intersecting corners to form an interior chamber 11 defined by the sidewalls. The sidewalls 14 and i 8 have inwardly sloped lower sections that direct material in the lower portion of the chamber 11 toward the chamber's center. The chamber 11 contains approximately three-quarters of a cubic yard of material, and is substantially square when viewed from the top for positioning the center of gravity of the material contained in the chamber near the center of the hopper.

The front sidewall 12 of the hopper has an aperture (not shown) near its lower edge that opens into the chamber 11. The hollow, cylindrical tube 20 attaches to the front sidewall 12 with a cylindrical passage in the tube 20 aligned with the aperture in the front sidewall 12. The cylindrical tube passage is defined by the interior surface 22 of the tube wall 24 that is preferably circular in section, but could be elliptical or any other polygon shape. Approximately the lower half of the tube wall 24 extends beyond the front sidewall 12 to the opposite sidewall 16 to form the bottom wall of the hopper 10. The lateral edges of this lower wall are attached to the lower edges of the sidewalls 14 and 18.

The tube 20 is divided along its length into two sections. The fixed section 32 is rigidly mounted to the hopper 10. The removable section 30 mounts to the end of the fixed section 32 farthest from the hopper 10. The connector lip 26 extends around the entire periphery of one end of the removable section 30. The connector lip 28 extends around the entire periphery of one end of the fixed section 32. When the sections 30 and 32 are mounted together, the lip 26 is aligned with the lip 28, and screws extend from the lip 28 through aligned holes in the lip 26. Nuts are threaded onto the screws to rigidly fix the removable section 30 to the fixed section 32.

An auger 50 is mounted inside the tube 20, extending from a bearing 52 in the tube endcap 54 to another bearing, preferably the hydraulic motor 56, mounted to the sidewall 16. The bearing 52 is preferably a low function polymer, such as that sold under the trademark DELRIN, having a recess into which the auger's end is inserted. The hydraulic motor 56 is a conventional motor having a driveshaft into which the square, or alternatively the spline, shaft of the auger 50 mounts in a conventional manner. The auger 50 can be removed with access at only one end, because there is no complex connection at the motor 56.

The motor 56 is preferably connected to the hydraulic lines of a conventional forklift for driving the motor 56 in a manner that is apparent to those skilled in forklift technology. Of course, an electric, pneumatic, internal combustion or any other conventional motor could be substituted for the preferred motor 56, as will be apparent to one of ordinary skill in the art.

The endcap 54 is removably mounted to the free end of the tube 30 by conventional means, such as a pair of bolts 58 and 59 that extend through ears 60 and 61 formed on the exterior surface of the tube wall 24 and through ears 62 and 63 mounted to opposite sides of the endcap 54. Upon removal of the endcap 54 by removing the bolts 58 and 59 from the ears 62 and 63, the auger can be removed simply by grasping the cross bar 66 shown in FIG. 3 and pulling, thereby withdrawing the opposite end from its matingly engaged connection with the driveshaft of the hydraulic motor 56.

On the underside of the tube 20 is a hose mount 82, which is an annular tube mounted at its upper end to the tube 20. The tube 20 has a hose aperture 80 formed in its underside (see FIG. 3) that is aligned with a passage in the hose mount 82. The hose 84 mounts to the lower end of the hose mount 82, and the passage within the hose, as defined by the interior surface of the flexible hose sidewalls, is in fluid communication with the passage in the hose mount 82, and therefore the passage in the tube 20.

The hose 84 is hand-flexible, which is defined for the purposes of the present invention as able to be substantially deformed by the average human's hand when the hose is in operating conditions (humidity, temperature, etc.). For example, a hand-flexible hose includes a conventional garden hose and a conventional rubber-lined, fabric-reinforced fire hose.

Upon rotation by the hydraulic motor, the auger 50 drives fluent material contained in the hopper chamber 11 toward the endcap 54. Fluent material is defined as material that can flow, and includes high viscosity liquids, such as molasses and sludge, concrete or any other slurry, and particulate matter such as sand, gravel, coal, iron ore, soil, powder, wood chips and other particulate matter. The rotary motion of the auger 50 drives such material in a conventional manner. This driving force of the auger impels the material from the tube 20 through the hose aperture 80, through the hose mount 82 and into the hose 84 (see FIGS. 1 and 3). The material eventually pours out the discharge end of the hose that is opposite the end attached to the tube 20.

The hopper and tube combination is mounted on a plate 90 that is supported from beneath by four inverted rollers 92, 93, 94 and 95 shown in FIGS. 1 and 2. Each of the rollers 92–95 includes a pair of spaced plates with a wheel rotatably mounted in the space between the plates by an axle extending from one plate through the wheel to the other plate. The outer peripheral edge of the wheels seat against the underside of the plate 90 at 90 degree intervals around the central post 96, which is a hollow tube into which a shaft. (not shown) extends downwardly from the plate 90. The hopper 10 can rotate 360° about the central post 96, and the rollers 92–95 support the hopper 10 at positions that are spaced radially from the central post 96. As the hopper rotates, the wheels roll against the underside of the plate 90, thereby supporting the plate 90 and the hopper. The wheels are preferably aligned with their axes of rotation crossing at the central post 96. This configuration provides a very stable structure that permits rotation of the hopper and tube combination while preventing tipping over. Rotation also permits space to be reduced for shipping by rotating until the tube is extended the least distance from the rest of the machine.

Figure 6:
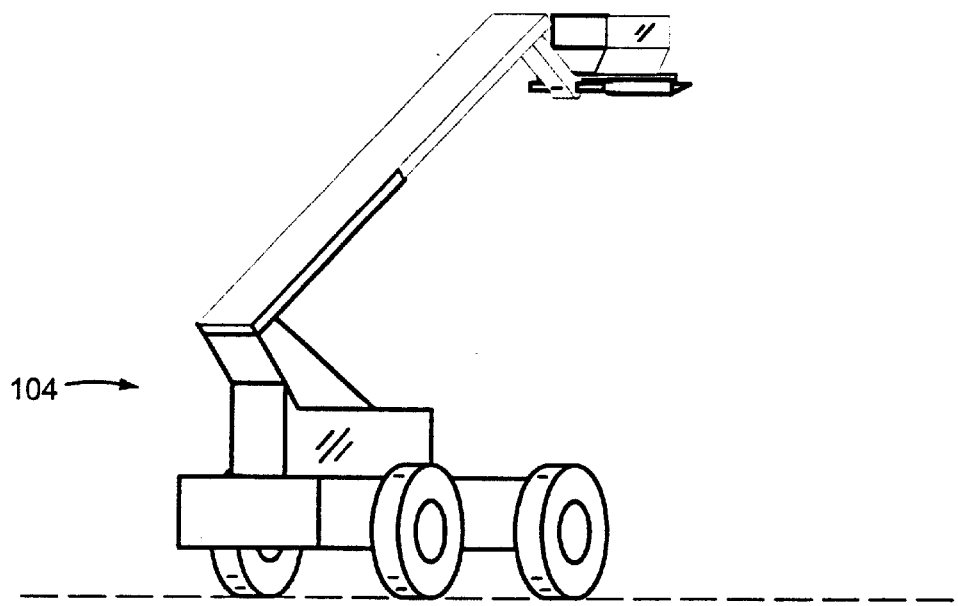
FIG. 6 is a view in perspective illustrating the present invention in operation and mounted on a forklift.
Figure 7:
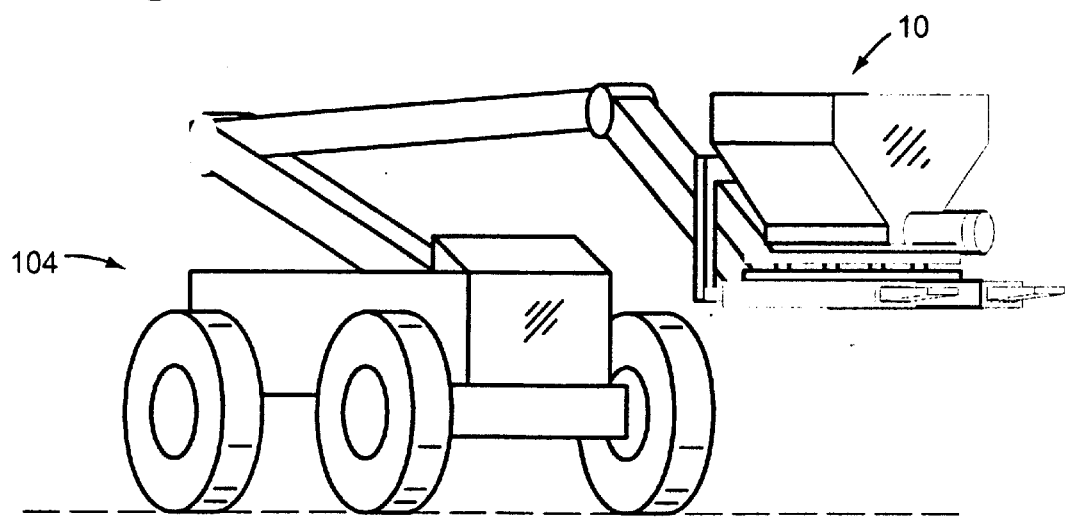
FIG. 7 is a view in perspective illustrating the present invention on a forklift.
Figure 8:
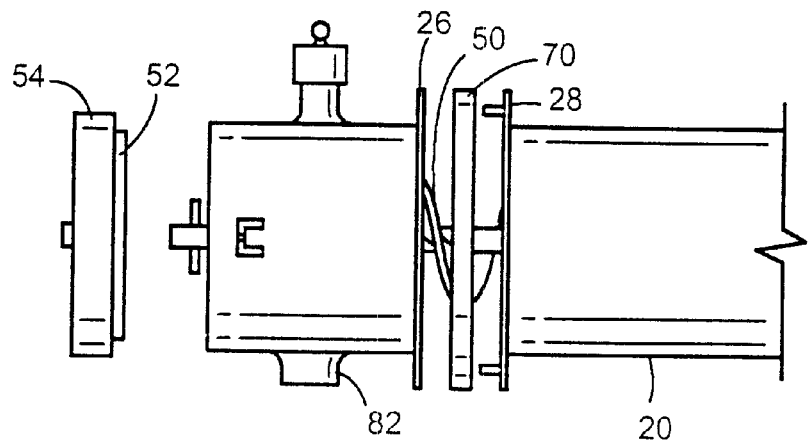
FIG. 8 is a side exploded view illustrating the tube and auger elements.
Figure 9:
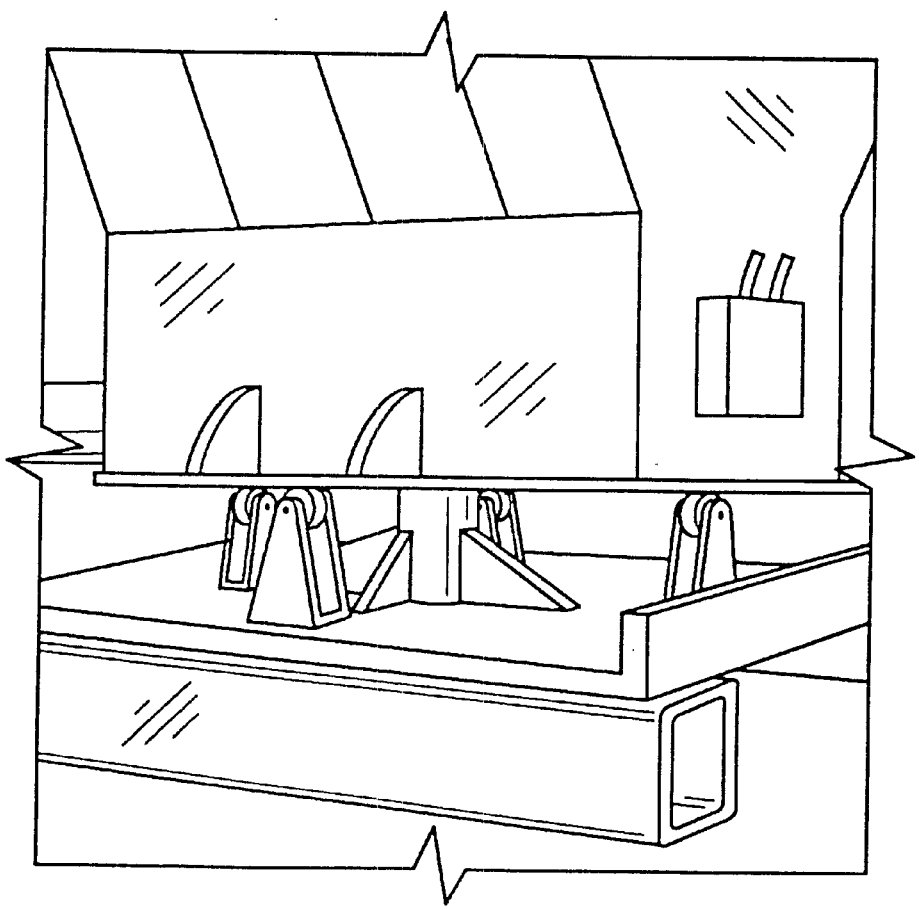
FIG. 9 is a view in perspective illustrating the support mechanisms for the hopper.
Figure 10:
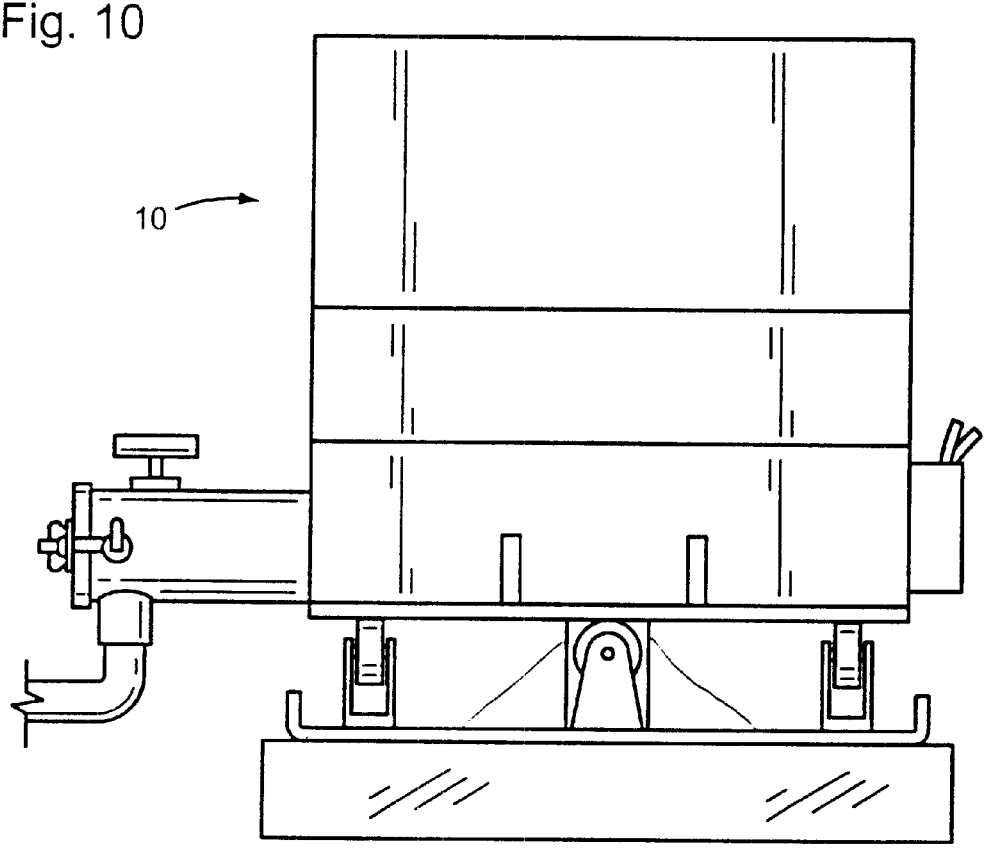
FIG. 10 is a side view illustrating the preferred embodiment of the present invention.
Figure 11:
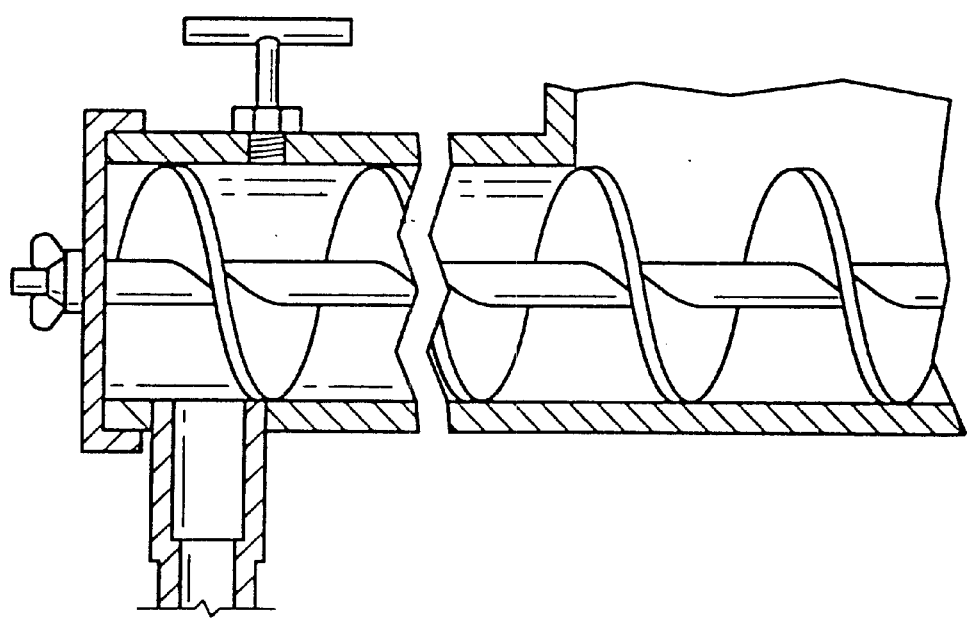
FIG. 11 is a side view in section illustrating an alternative embodiment of the present invention.
Figure 12:
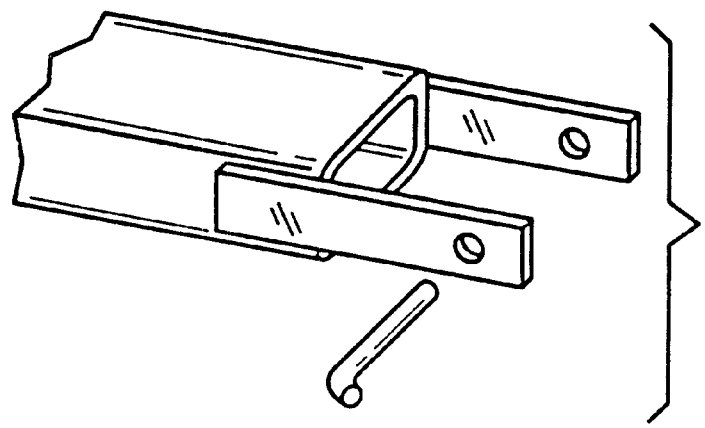
FIG. 12 is a view in perspective illustrating the mechanism at the back of one of the forklift-receiving box-beams that locks the box-beams to the forklift.

The lower ends of the plates of the rollers are rigidly mounted to the top surface of the plate 98 with the outer peripheral surface of the wheels thereof spaced above the plate 98. A pair of parallel forklift-receiving box-beams 100 and 102 are mounted to the underside of the plate 98. The box-beams 100 and 102 receive the forks of a conventional forklift 104 that can support the entire apparatus as shown in FIGS. 6 and 7.

The inverted rollers 92–95 provide a substantial advantage to the present invention. There is a clearance gap, on the order of the wheels' diameter, between the upper surface of the plate 98 and the lowest extreme of the outer peripheral edge of the wheels of the rollers. This clearance gap is large enough that any material that pools up on the plate 98 will flow off the plate 98 before it becomes deep enough to contact the lower edge of the wheels of the rollers 92–95. As a result, this material cannot stick to the wheels and get between the wheels and the plate 90 against which the rollers' wheels seat. Therefore, the inverted rollers' structure prevents material in the hopper that spills out from interfering with the rotation of the hopper or support by the rollers 92–95.

The cooperation between the auger, the tube and other structures is important. In one embodiment, the outer surface of the auger 50 is spaced from the interior surface 22 of the tube wall, forming a gap. The preferred gap is approximately one and one quarter inches, which permits use of the apparatus with three-quarter inch aggregate. The gap size could be made to be from one half inch to two inches with similar functioning of the machine. The variation could be even greater, for example from between one eighth inch to more than two inches, but disadvantages relating to pressure and particle size may make such gap sizes prohibitive. There could, of course, be essentially no gap, resulting in wear. However, such a structure may be desirable under some circumstances, such as when materials that may crush easily, such as lime dust, crusted sand are being used. Other materials that may require such a structure include metal shavings.

The gap between the outer surface of the auger 50 and the tube wall 24 prevents a high pressure from being created between the interior chamber 11 of the hopper 10 and the interior passage of the hose 84 that would exist without the gap. The high pressure would make it difficult to stop flow of the material without building substantial pressure in the tube and hose. A smaller gap would create more pressure, and a larger gap would create less. Smaller particulate could bind in a smaller gap, and a larger gap would permit larger particles to pass through. The size of the gap is determined by the material to be dispensed, and the preferred frequency of replacing the auger or tube.

The sections 30 and 32 of the tube 20 clampingly retain the flange between the connector lips 26 and 28. The flange is preferably a one-half inch thick rubber or polyurethane plate having an orifice in its center defined by an inner surface 71 for permitting the auger 50 to pass therethrough. The flange is positioned to limit the flow of material from the fixed section 32 of the tube to the removable section 30 by occupying, at one point along the length of the auger 50, the gap between the outer surface of the auger 50 and the interior surface 22 of the tube wall 24. The flange 70 prevents extremely low viscosity (low slump) slurries from simply emptying into the hose 84 under the force of gravity and the pressure created thereby in the tube and chamber 11.

The internal flange edge that defines the orifice in the flange 70 preferably seats against the lands of the auger 50. Alternatively the orifice could have a diameter that is larger than the outer diameter of the auger, thereby forming a gap between the interior surface 71 and the outer surface of the auger 50, but a gap smaller than that between the tube wall 24 and the outer surfaces of the auger. This would provide a similar effect to the preferred embodiment, although less of one than when there is no gap. This alternative embodiment would permit larger particles to pass through the orifice of the flange, and would make the slurry material flow more quickly than the same material in the preferred embodiment.

While the auger is rotating, the flange expands outwardly, permitting slurry material to pass through. Once the auger is stopped, the flange contracts around the auger, thereby hindering slurry material from flowing past the flange.

The flange could, rather than being clamped between the fixed and removable sections 30 and 32 of the tube 50, be mounted to the interior surface of a tube sidewall. As a further alternative, the flange could be mounted directly to the auger and extend outwardly to seat against the tube sidewall.

During use, the auger 50 is rotated to promote the flow of fluent material, such as concrete slurry, from the chamber 11, through the tube 20, down the hose 84 and out of the opposite hose end. The hose 84 is directed into, for example, an opening in the interior of a block wall, as shown in FIG. 6. The concrete slurry flows into the opening until it is full and the operator must move the open end of the hose to the next opening. Before doing so, the operator pinches the end of the hose by hand to stop the flow of material through the hose. Then the outlet end of the hose is moved to the next void. Pinching can be accomplished by simply compressing the sidewalls by hand at one point alone, or compressing the sidewalls in combination with folding the hose over itself or around an object.

During movement of the hose, a slight pulling force on the hose can rotate the hopper about the central post 96. Rotation of the hopper allows an operator with a small length of hose, such as seven feet, to fill an approximately 20 foot long section of wall. Once the hose is moved to the next opening, the pinching force is released, thereby opening the discharge end of the hose to permit the flow of concrete slurry into the block opening. A lockdown pin 97 can be extended down from the plate 90 into one of four or more apertures formed on the lower platform 98 for preventing rotation of the hopper during transport.

During movement of the hose from one opening to another, there is no spillage of concrete, and there is no requirement to slow or stop the auger. Even if it takes a substantially greater than normal amount of time to move the hose, such as several seconds, a minute, or more, there is little danger of spillage or of pressure buildup that will cause hose rupture or leakage.

The reason there is no pressure buildup is that the auger does not create a significant pressure differential between one end of the auger and the other. There is just enough pressure differential that, in combination with the pressure caused by gravity acting on the slurry in the hopper, slurry material tends to flow toward the hose. As described above, the gap between the outer surface of the auger and the interior surface of the tube wall 24 allows substantially free flow of material, thereby preventing any large pressure differentials from being created. When the hose 84 is pinched off, the auger continues to rotate, but the concrete slurry around the auger 50 is not driven toward the hose. The auger simply rotates in the concrete slurry around it.

One advantage to the preferred embodiment preventing pressure buildup is that the hydraulic motor driving the auger 50 does not need to be started and stopped during operation. The operator simply pinches the hose and the flow of slurry stops. When slurry is desired to be discharged from the hose again, the pinching force on the hose is simply released. Therefore, the operator who is pouring the slurry controls the entire machine. And there is no complex valve mechanism at the outlet end to become worn out or clogged, or needing regular, time-consuming cleaning.

The gap around the auger cooperates with the flange and the hose. With the hose, the user can cut off flow of grout at the insertion point, and the auger does not need to be stopped, because of the gap that allows it to simply spin and not impel more material down the hose. When the hose is pinched or kinked, the flange hinders the material that is being gently impelled by the auger from flowing past the flange into the hose. Without this flange, it would be too difficult to stop the flow of grout merely by pinching or kinking the hose by hand.

Stated concisely, without the gap, the auger would tend to force grout through the tube at too high of pressure to enable a person to stop the grout by hand kinking the hose. Without the flange, grout could flow too much by gravity and under the gentle impelling force of the auger into the hose when the hose is being pinched, thereby filling the hose further and possibly creating too much pressure to hold back by hand.

Figure 5:
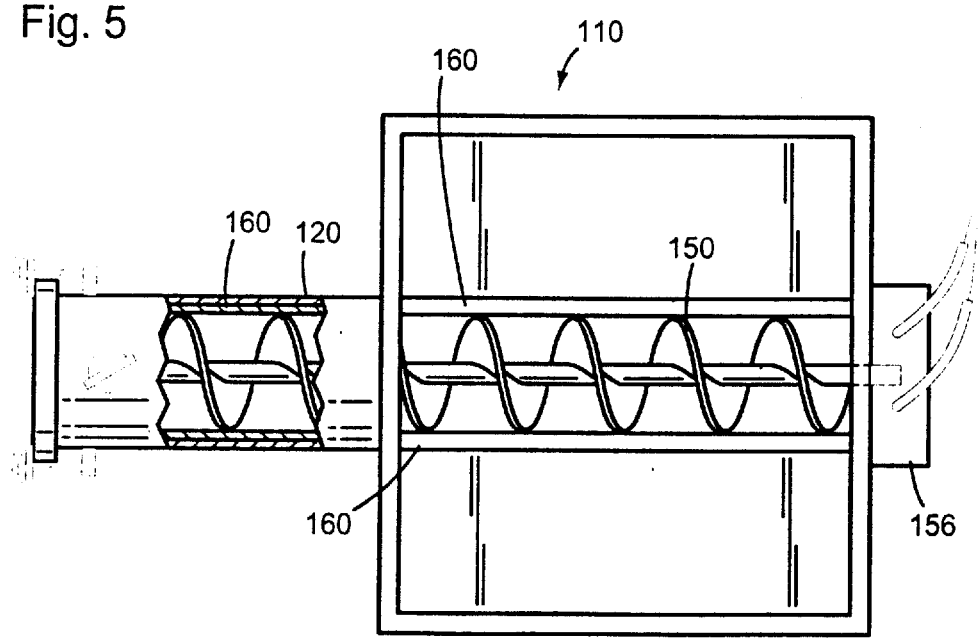
FIG. 5 is a top view illustrating an alternative embodiment of the present invention.

Another embodiment of the present invention is shown in FIG. 5. The hopper 110, auger 150 and hydraulic motor 156 are essentially identical to those described and shown in FIGS. 1 through 4. The auger 150 is slightly larger in diameter than the auger 50. Instead of a flange, the apparatus shown in FIG. 5 has a compressible, preferably rubber or polyurethane, cylindrical boot or sleeve 160 occupying the gap between the outer surface of the auger and the interior surface of the tube 120. The sleeve 160 extends around the auger the entire auger length, except in the hopper where the sleeve has an opening to permit material to flow into the auger.

The interior surface of the sleeve 160 abuts the outer surfaces, referred to as the lands, of the auger 150, along the length of the tube 120 except at the hose mount, where an opening is formed in the sleeve. This sleeve provides a substantial seal promoting driving of the slurry toward the hose (not shown). If a rock or stone is forced between a land and the sleeve 160, instead of the rock breaking or deforming the auger, the sleeve 160 compresses, permitting the particle to pass over the land.

Figure 13:
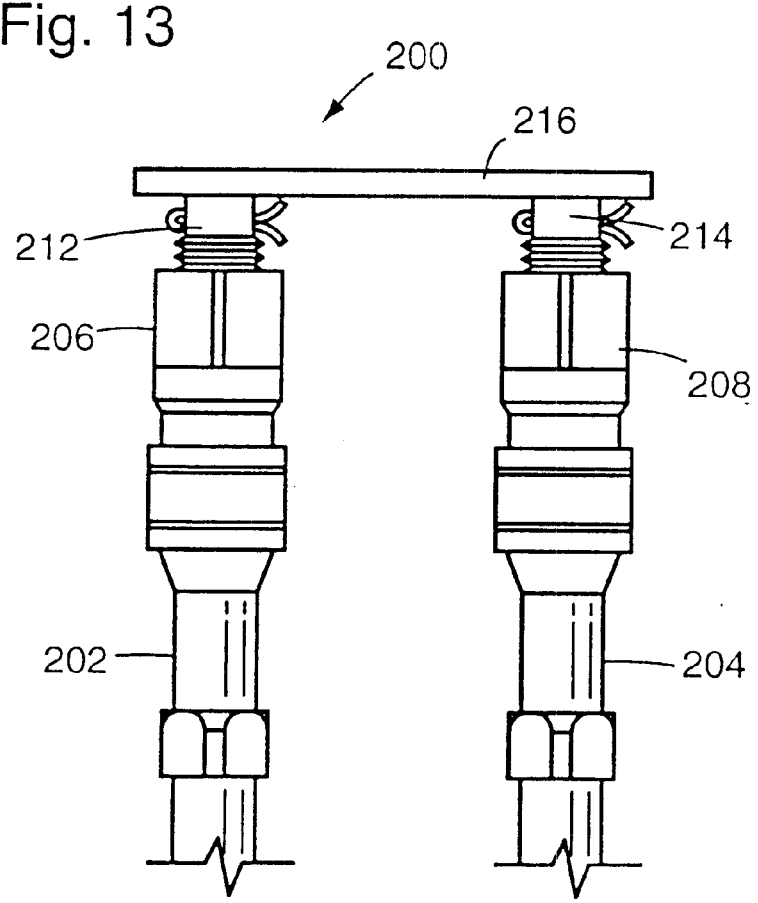
FIG. 13 is a side view illustrating the hydraulic hose rest.
Figure 14:
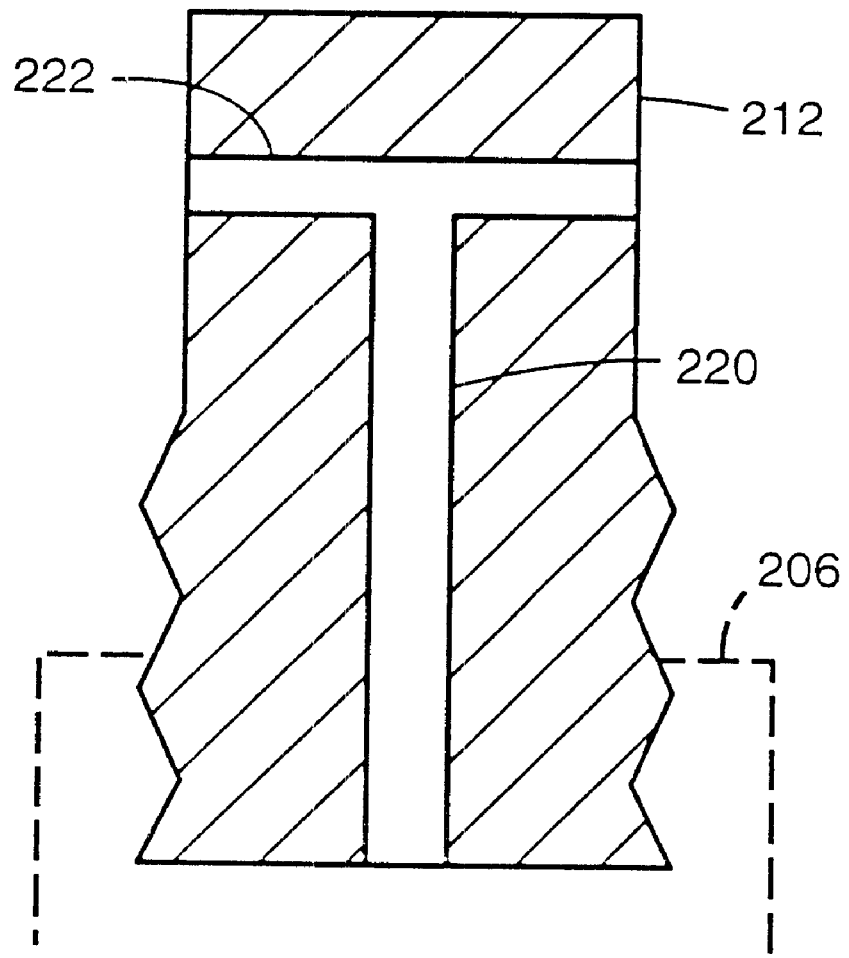
FIG. 14 is a side view in section illustrating the threaded plug of the hose rest.

The present invention includes a hydraulic hose rest 200 shown in FIGS. 2, 13 and 14. The hydraulic motor that preferably drives the auger has hydraulic hoses 202 and 204 that extend from the hydraulic motor to the hydraulic system connectors of a forklift, such as the forklift 104 shown in FIG. 6. When the apparatus is not mounted to a forklift, the hydraulic hoses 202 and 204 are connected not to the forklift's connectors, but the hose rest 200.

As shown in more detail in FIG. 13, the hose rest 200 has a pair of male connectors 206 and 208 essentially identical to those on a conventional forklift. The male connectors 206 and 208 are threaded onto a pair of threaded steel plugs 212 and 214, respectively. The steel plugs 212 and 214 are mounted, such as by welds, to a steel plate 216. The hose rest 200, therefore, does not connect the hoses 202 and 204 to a hydraulic system, but merely attaches them to a stable support by a conventional connector.

When the hydraulic hoses 202 and 204 are not connected to the connectors of a forklift, they should be mounted to the male connectors 206 and 208. This will prevent debris from entering the hydraulic fluid within the hoses by contacting the insides of the fittings on the ends of the hoses 202 and 204.

It is also well known in the construction equipment industry that when hydraulic hoses, which are normally black, are exposed to the sun their temperature rises. The temperature can change for several reasons, but this is a very common one. This temperature rise increases the temperature of the fluid within the hoses, causing the fluid to expand. Because there is little room to expand in a hydraulic hose, the pressure of the fluid increases dramatically, making it very difficult to mount the hose's female connector to a male connector.

The hose rest 200 has an additional structure that prevents an increase in pressure. The hose rest thereby functions as a pressure release. As is shown in FIG. 14, a longitudinal passage 220 is formed, preferably by drilling, and extends from the end of the plug 212 to which the male connector 206 mounts to a lateral passage 222. The lateral passage extends from one side of the plug 212 to the opposite side, and is preferably formed by drilling.

When the temperature of the fluid in the hydraulic hose 202 increases and the fluid expands, the fluid can push upwardly, as it expands, through the passage 220 and then the passage 222. This path from the fluid in the hose to the atmosphere prevents any pressure from building up in the first place within the hose, thereby preventing the problem of re-connecting the hose to another male fitting.

It has furthermore been found desirable to extend a thin fiber, such as the pair of half round wires of a conventional "cotter" pin 230 shown in FIG. 13, through the lateral passage 222. The enlarged end of the cotter pin 230 and the bent wires of the opposite end prevent hydraulic fluid from squirting straight out of the openings to the lateral passage 222. Any fluid that flows rapidly through the lateral passage 222 is directed by the cotter pin ends in directions that are transverse to the axis of the lateral passage 222. Squirting of the fluid is only possible when the hose is first connected to the hose rest 200, because once the hose is connected, all pressure is released and no pressure can build up again within the hose due to the passages connecting to the atmosphere.

Of course, the passages of the plug 212 could have virtually any configuration as will be apparent to a person of ordinary skill in the art, so long as the passages lead from the interior of the hydraulic hose in fluid communication with the environment or some other lower pressure container. An alternative low pressure container is a small reservoir that the fluid drains into, such as a bellows, that expands to permit fluid to enter the bellows, but contracts as the fluid cools, thereby preventing fluid from entering the environment surrounding the hoses.

While certain preferred embodiments of the present invention have been disclosed in detail, it is to be understood that various modifications may be adopted without departing from the spirit of the invention or scope of the following claims.

What is claimed is:

1. A liquid pressure relief valve for relieving liquid pressure in a liquid-containing hose having a first connector on an end thereof, the relief valve comprising:

(a) a second connector removably attached to the first connector to permit substantially unrestricted liquid communication between the liquid-containing hose and the second connector;

(b) a plug mounted to the second connector, said plug having a passage formed therein extending through the plug from liquid communication with the second connector at one end of the passage to a lower pressure container at an opposite end of the passage, for passing liquid from the liquid-containing hose through the first and second connectors and the passage to the lower pressure container.

2. The liquid pressure relief valve in accordance with claim 1, wherein the lower pressure container is the environment.

3. The liquid pressure relief valve in accordance with claim 1, further comprising a thin fiber extending through the passage for resisting the flow of liquid through the passage.

4. The liquid pressure relief valve in accordance with claim 3, wherein the thin fiber is a cotter pin.

\* \* \* \* \*